(12) United States Patent
Li et al.

(10) Patent No.: US 11,182,564 B2
(45) Date of Patent: Nov. 23, 2021

(54) TEXT RECOMMENDATION METHOD AND APPARATUS, AND ELECTRONIC DEVICE

(71) Applicant: Tencent Technology (Shenzhen) Company Limited, Shenzhen (CN)

(72) Inventors: Bingfeng Li, Shenzhen (CN); Xin Fan, Shenzhen (CN); Xiaoqiang Feng, Shenzhen (CN); Biao Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 34 days.

(21) Appl. No.: 16/848,028

(22) Filed: Apr. 14, 2020

(65) Prior Publication Data
US 2020/0242304 A1    Jul. 30, 2020

Related U.S. Application Data

(63) Continuation of application No. PCT/CN2018/118274, filed on Nov. 29, 2018.

(30) Foreign Application Priority Data

Nov. 29, 2017  (CN) .......................... 201711225593.1

(51) Int. Cl.
G06F 40/30      (2020.01)
G06N 3/08       (2006.01)

(52) U.S. Cl.
CPC ............... *G06F 40/30* (2020.01); *G06N 3/08* (2013.01)

(58) Field of Classification Search
CPC .................................. G06F 40/30; G06N 3/08
See application file for complete search history.

(56) References Cited

U.S. PATENT DOCUMENTS 10,437,833 B1 * 10/2019 Nguyen ................. G06F 40/247
2014/0278379 A1 *  9/2014 Coccaro .............. G10L 15/1822
                                                               704/202
2015/0356152 A1   12/2015 Tsuchida et al.

FOREIGN PATENT DOCUMENTS

CN     103186527 A     7/2013
CN     103207899 A     7/2013
(Continued)

OTHER PUBLICATIONS

Zhang, Qun et al., "Classifying Short Texts with Word Embedding and LDA Model", (New Technology of Library and Information Service), No. 277, Dec. 25, 2016.
(Continued)

*Primary Examiner* — Kevin Ky
(74) *Attorney, Agent, or Firm* — Morgan, Lewis & Bockius LLP

(57) ABSTRACT

Embodiments of this application provide a text recommendation method performed at an electronic device. The method includes: extracting feature content of from the a target text; processing the feature content by using at least two text analysis models to obtain at least two semantic vectors; integrating the at least two semantic vectors into an integrated semantic vector of the target text; selecting, according to the integrated semantic vector and an integrated semantic vector of at least one to-be-recommended text, a recommended text corresponding to the target text from the at least one to-be-recommended text. Because the integrated semantic vector of the target text is obtained based on the at least two text analysis models, the integrated semantic vector has a stronger representing capability. When text recommendation is subsequently performed, an association degree between the recommended text and the target text can be increased, thereby improving recommendation accuracy.

17 Claims, 11 Drawing Sheets

(56) References Cited

FOREIGN PATENT DOCUMENTS

| CN | 103823848 A | 5/2014 |
|----|-------------|--------|
| CN | 104657350 A | 5/2015 |
| CN | 104850537 A | 8/2015 |
| CN | 106407280 A | 2/2017 |
| CN | 106445919 A | 2/2017 |
| CN | 106502989 A | 3/2017 |
| CN | 106874258 A | 6/2017 |
| CN | 107291699 A | 10/2017 |
| CN | 107330023 A | 11/2017 |

OTHER PUBLICATIONS

Tencent Technology, ISRWO, PCT/CN2018/118274, Feb. 27, 2019, 7 pgs.
Tencent Technology, IPRP, PCT/CN2018/118274, Jun. 2, 2020, 5 pgs.

* cited by examiner

TEXT RECOMMENDATION METHOD AND APPARATUS, AND ELECTRONIC DEVICE

RELATED APPLICATION

This application is a continuation application of PCT Application No. PCT/CN2018/118274, entitled "TEXT RECOMMENDATION METHOD AND APPARATUS, AND ELECTRONIC DEVICE" filed on Nov. 29, 2018, which claims priority to Chinese Patent Application No. 201711225593.1, entitled "TEXT RECOMMENDATION METHOD AND APPARATUS, AND ELECTRONIC DEVICE" filed with the China National Intellectual Property Administration on Nov. 29, 2017, all of which are incorporated by reference in their entirety.

FIELD OF THE TECHNOLOGY

Embodiments of this application relate to the field of text analysis technologies, and in particular, to a text recommendation method and apparatus and an electronic device.

BACKGROUND OF THE DISCLOSURE

A text analysis technology refers to a technology of quantifying a feature word extracted from a text to represent text information. At present, the text analysis technology is mainly applied to the field of text recommendation, that is, recommending, to a user based on text content browsed by the user, other content in which the user may be interested.

Text recommendation methods provided in the related art are generally based on a collaborative filtering algorithm. The collaborative filtering algorithm may be a user and/or content-based collaborative filtering algorithm. Using the user-based collaborative filtering algorithm as an example, a similar user set is first determined based on behavioral data of users. The similar user set includes at least two users. When text recommendation is subsequently performed, a text browsed by a user in the similar user set is recommended to another user in the similar user set. For example, the similar user set includes a user A and a user B, and a text browsed by the user A is recommended to the user B.

In the related art, an association degree between a text recommended to a user and a text that the user wants to browse or has browsed is relatively small, and recommendation accuracy is relatively low.

SUMMARY

Embodiments of this application provide a text recommendation method and apparatus and an electronic device, to resolve a problem in the related art that an association degree between a text recommended to a user and a text that the user wants to browse or has browsed is relatively small, and recommendation accuracy is relatively low. The technical solutions are as follows:

According to a first aspect, a text recommendation method is performed at an electronic device, the method including:

extracting feature content from a target text;

processing the feature content based on at least two text analysis models to obtain at least two semantic vectors of the target text;

integrating the at least two semantic vectors of the target text into an integrated semantic vector of the target text; and selecting, according to the integrated semantic vector of the target text and an integrated semantic vector of at least one to-be-recommended text, a recommended text corresponding to the target text from the at least one to-be-recommended text.

According to a second aspect, an electronic device is provided, including a processor and a memory, the memory storing at least one instruction, at least one program, and a code set or an instruction set, and the at least one instruction, the at least one program, and the code set or the instruction set being loaded and executed by the processor to implement the text recommendation method according to the first aspect.

According to a third aspect, a non-transitory computer-readable storage medium is provided, the computer-readable storage medium storing at least one instruction, at least one program, and a code set or an instruction set, and the at least one instruction, the at least one program, and the code set or the instruction set being loaded and executed by a processor to implement the text recommendation method according to the first aspect.

The technical solutions provided in the embodiments of this application may bring the following beneficial effects:

The integrated semantic vector of the target text is obtained by obtaining the at least two semantic vectors based on the at least two text analysis models and integrating the at least two semantic vectors. Because semantic vectors obtained by using different analysis models have respective advantages, the integrated semantic vector obtained by integrating the semantic vectors integrates the advantages of the semantic vectors. Therefore, the integrated semantic vector has a stronger representing capability, and can better represent text information of the target text. When text recommendation is subsequently performed based on the integrated semantic vector, an association degree between the recommended text and the target text can be increased, thereby improving recommendation accuracy.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make objectives, technical solutions, and advantages of this application clearer, the following further describes in detail implementations of this application with reference to the accompanying drawings.

Figure 1:
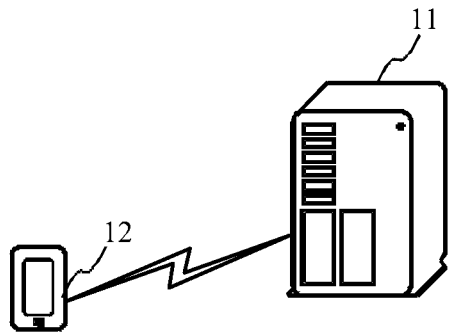
FIG. 1 is a schematic diagram of an implementation environment according to an exemplary embodiment of this application.

FIG. 1 is a schematic diagram of an implementation environment according to an embodiment of this application. The implementation environment includes a first device 11 and a second device 12.

The first device 11 may be an electronic device having a text analysis function. Optionally, the first device 11 may perform each step of the text recommendation method provided in the embodiments of this application by using the text analysis function. The first device 11 may be a terminal device such as a personal computer (PC), a smartphone, or a tablet computer, or may be a server. The server may be one server, a server cluster including a plurality of servers, or a cloud computing service center.

The second device 12 may be an electronic device having a text presentation function. Optionally, the second device 12 has a client of a specified type installed, and the client of the specified type is configured to implement the text presentation function. That is, the client of the specified type can receive a recommended text sent by the first device 11, and present the recommended text. The client of the specified type may be a reading-type client, an information-type client, or the like. The second device 12 may be a terminal device such as a PC, a smartphone, or a tablet computer.

A communications connection is established between the first device 11 and the second device 12 by using a wired network or a wireless network. In this embodiment of this application, only an example in which the second device 12 is a terminal device and the first device 11 is a server corresponding to the client of the specified type in the second device 12 is used for description.

In the embodiments of this application, an integrated semantic vector of a target text is obtained by obtaining at least two semantic vectors of the target text based on at least two text analysis models and integrating the at least two semantic vectors. Because semantic vectors obtained by using different analysis models have respective advantages, the integrated semantic vector obtained by integrating the semantic vectors integrates the advantages of the semantic vectors. Therefore, the integrated semantic vector has a stronger representing capability, and can better represent text information of the target text. When text recommendation is subsequently performed based on the semantic vector, an association degree between the recommended text and the target text can be increased, thereby improving recommendation accuracy.

Figure 2:
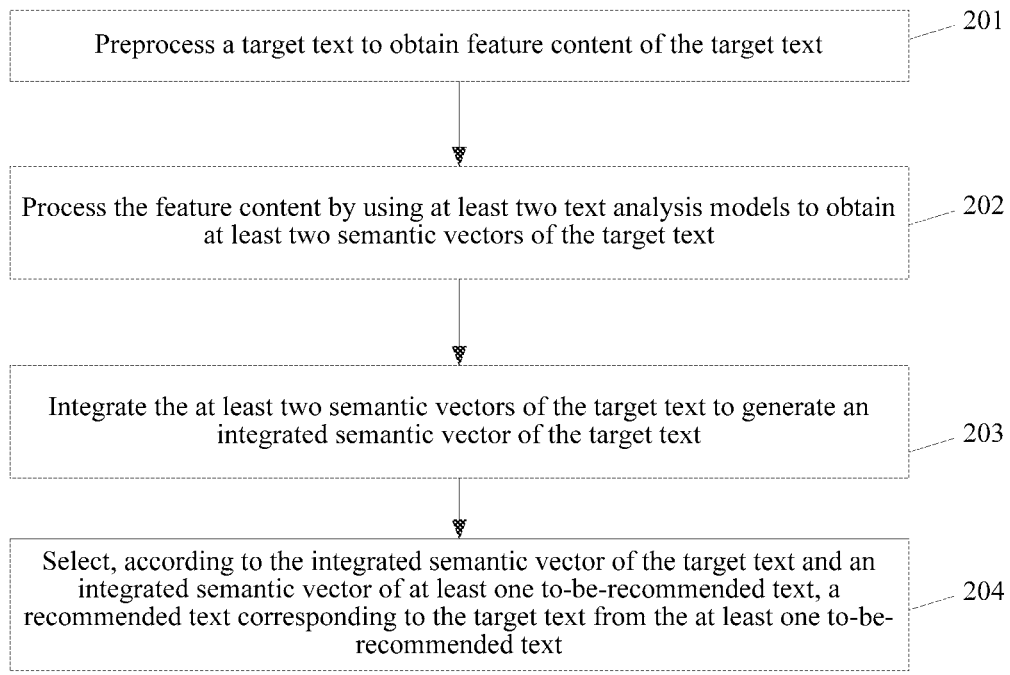
FIG. 2 is a flowchart of a text recommendation method according to an exemplary embodiment of this application.

FIG. 2 is a flowchart of a text recommendation method according to an embodiment of this application. The text recommendation method may be applied to the first device 11 in the implementation environment shown in FIG. 1. The method includes the following steps:

Step 201: Preprocess a target text to obtain feature content of the target text.

A database is set in the server, and the database includes a plurality of texts. The target text may be any one of the plurality of texts. Optionally, the server directly reads the target text from the database.

The feature content of the target text is highly extracted from the target text, and generally may be used for representing text information included in the target text in a summarized manner. Optionally, the feature content of the target text includes a title and a main feature word of the target text.

The title of the target text is generally directly obtained by the server. After obtaining the title of the target text, the server generally needs to perform word segmentation on the title. The word segmentation refers to dividing the title of the target text into individual words. For example, word segmentation is performed on a sentence "word segmentation is foundation of text mining", and five words such as "word segmentation", "is", "foundation", "of", and "text mining" are obtained. An algorithm used for performing word segmentation on the title of the target text may be a word segmentation algorithm based on string matching, a word segmentation algorithm based on understanding, a word segmentation algorithm based on statistics, or the like, which is not limited in this embodiment of this application. The main feature word of the target text refers to a keyword included in a main body of the target text, and generally may be used for representing the main body of the target text in a summarized manner.

Step 202: Process the feature content based on at least two text analysis models to obtain at least two semantic vectors of the target text.

The semantic vector is a result of processing the feature content by using the text analysis model. The text analysis model is in a one-to-one correspondence with the semantic vector. When different text analysis models are used, sizes, directions, and dimensions of obtained semantic vectors may be different. A specific implementation process of obtaining the at least two semantic vectors is explained in the following embodiment.

The text analysis model may be a word2vec model, a deep neural network (DNN) model, a Latent Dirichlet allocation (LDA) model, or the like, which is not limited in this embodiment of this application.

Step 203: Integrate the at least two semantic vectors of the target text to generate an integrated semantic vector of the target text.

In this embodiment of this application, the feature content is processed based on the at least two text analysis models, and the at least two semantic vectors are integrated to obtain the integrated semantic vector of the target text. Because semantic vectors obtained by using different analysis models have respective advantages, the integrated semantic vector obtained by integrating the semantic vectors integrates the advantages of the semantic vectors. Therefore, the integrated semantic vector has a stronger representing capability, and can better represent text information of the target text. When text recommendation is subsequently performed based on the integrated semantic vector, an association degree between the recommended text and the target text is relatively high, thereby improving recommendation accuracy.

Optionally, the at least two semantic vectors are spliced to obtain a semantic vector corresponding to the target text. Vector splicing refers to splicing at least two vectors into one vector, and a dimension of the vector obtained after the splicing needs to be greater than a dimension of any vector before the splicing. The dimension of the vector is used for indicating a representing capability of the vector, and a greater dimension of the vector indicates a stronger representing capability of the vector.

Step 204: Select, according to the integrated semantic vector of the target text and an integrated semantic vector of at least one to-be-recommended text, a recommended text corresponding to the target text from the at least one to-be-recommended text.

The to-be-recommended text may be a text in the database other than the target text. Optionally, a manner of obtaining the integrated semantic vector of the to-be-recommended text is the same as a manner of obtaining the integrated semantic vector of the target text. That is, the server first preprocesses the to-be-recommended text to obtain feature content of the to-be-recommended text, and then the server processes the feature content of the to-be-recommended text by using the at least two text analysis models to obtain at least two semantic vectors of the to-be-recommended text, and integrates the at least two semantic vectors to obtain the integrated semantic vector of the to-be-recommended text.

In conclusion, in the technical solutions provided in the embodiments of this application, the integrated semantic vector of the target text is obtained by obtaining the at least two semantic vectors based on the at least two text analysis models and integrating the at least two semantic vectors. Because semantic vectors obtained by using different analysis models have respective advantages, the integrated semantic vector obtained by integrating the semantic vectors integrates the advantages of the semantic vectors. Therefore, the integrated semantic vector has a stronger representing capability, and can better represent text information of the target text. When text recommendation is subsequently performed based on the semantic vector, an association degree between the recommended text and the target text can be increased, thereby improving recommendation accuracy.

Figure 3A:
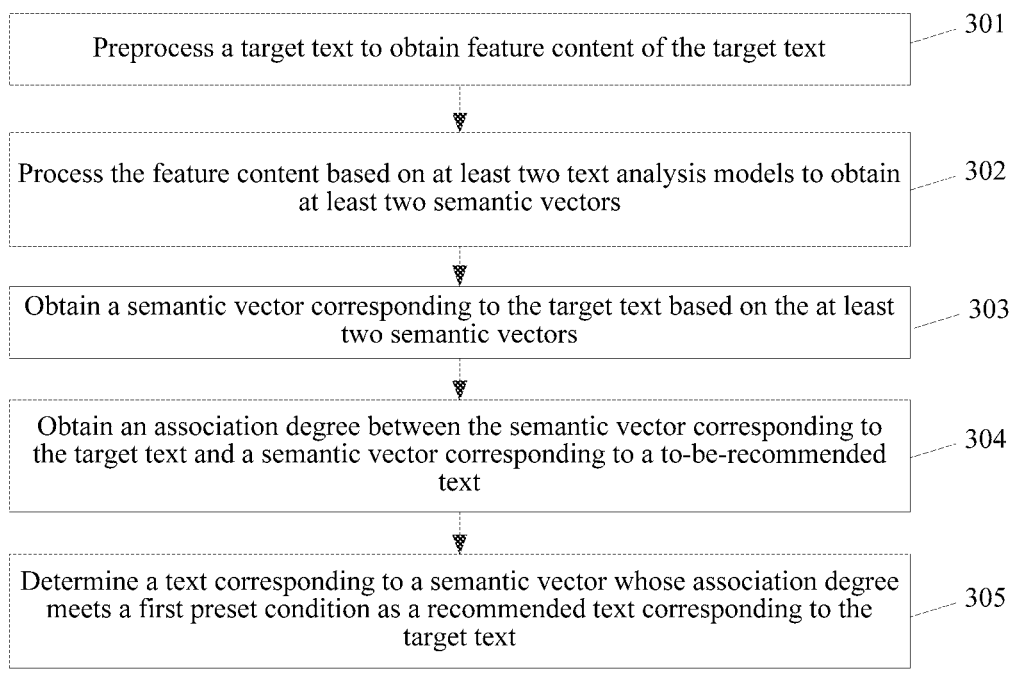
FIG. 3A is a flowchart of a text recommendation method according to an exemplary embodiment of this application.

FIG. 3A is a flowchart of a text recommendation method according to an embodiment of this application. The method may include the following steps:

Step 301: Preprocess a target text to obtain feature content of the target text.

A process of obtaining a main feature word of the target text is as follows:

Step 301a: Perform word segmentation on a main body of the target text to obtain a plurality of words.

This step is to divide the main body of the target text into individual words. An algorithm used for performing word segmentation on the main body of the target text may be a word segmentation algorithm based on string matching, a word segmentation algorithm based on understanding, a word segmentation algorithm based on statistics, or the like, which is not limited in this embodiment of this application.

Step 301b: Obtain a term frequency-inverse document frequency (TF-IDF) indicator corresponding to each word.

A TF-IDF indicator of a word may be measured by an occurrence frequency of the word in the target text and an occurrence frequency of the word in a to-be-recommended text. If a word occurs more frequently in the target text and the word occurs less frequently in the to-be-recommended text, a TF-IDF indicator of the word is higher. If a word occurs less frequently in the target text and the word occurs more frequently in the to-be-recommended text, a TF-IDF indicator of the word is lower.

The TF-IDF indicator may be used for evaluating an importance degree of the word in the target text. The TF-IDF indicator is in a positive correlation with the importance degree of the word in the target text. That is, a higher TF-IDF indicator of the word indicates a higher importance degree of the word in the target text; a lower TF-IDF indicator of the word indicates a lower importance degree of the word in the target text.

Step 301c: Determine a word whose TF-IDF indicator meets a preset value and whose word class is a preset word class as a main feature word of the target text.

The preset value may be set according to actual experience, which is not limited in this embodiment of this application. A word class of a word may be any one of a noun, a verb, an adjective, and an adverb. The adjective and the adverb are usually used for modification but have no substantial meaning. For example, the adjective is usually used for modifying a noun, and the adverb is usually used for modifying a verb. Therefore, in this embodiment of this application, the preset word class may be the noun and/or the verb. In another possible example, words that are nouns or verbs are sequenced according to values of their TF-IDF indicators, and words whose TF-IDF indicators rank the first n places are determined as main feature words of the target text. A value of n may be preset. For example, n is 5.

Step 302: Process the feature content based on at least two text analysis models to obtain at least two semantic vectors.

Step 303: Obtain a semantic vector corresponding to the target text based on the at least two semantic vectors.

Step 304: Obtain an association degree between the semantic vector corresponding to the target text and a semantic vector corresponding to a to-be-recommended text.

The association degree is used for representing a similarity between the target text and the to-be-recommended text. The association degree is in a positive correlation with the similarity. That is, a greater similarity between the target text and the to-be-recommended text indicates a greater association degree between the semantic vector corresponding to the target text and the semantic vector corresponding to the to-be-recommended text; a smaller similarity between the target text and the to-be-recommended text indicates a smaller association degree between the semantic vector corresponding to the target text and the semantic vector corresponding to the to-be-recommended text.

Optionally, the server calculates a cosine distance between the semantic vector of the target text and the semantic vector of the to-be-recommended text to obtain the association degree between the semantic vector corresponding to the target text and the semantic vector corresponding to the to-be-recommended text. The cosine distance is in a positive correlation with the association degree. That is, a greater cosine distance between the semantic vector of the target text and the semantic vector of the to-be-recommended text indicates a greater association degree between the semantic vector corresponding to the target text and the semantic vector corresponding to the to-be-recommended text; a smaller cosine distance between the semantic vector of the target text and the semantic vector of the to-be-recommended text indicates a smaller association degree between the semantic vector corresponding to the target text and the semantic vector corresponding to the to-be-recommended text.

A cosine distance cos θ between two semantic vectors may be calculated by using the following formula:

$$\cos\theta = \frac{\sum_{i=1}^{n}(A_i \times B_i)}{\sqrt{\sum_{i=1}^{n}(A_i)^2} \times \sqrt{\sum_{i=1}^{n}(B_i)^2}}$$

where n is a dimension of the two semantic vectors, $A_i$ is a first semantic vector, $B_i$ is a second semantic vector, $$\sqrt{\sum_{i=1}^{n}(A_i)^2}$$

is a magnitude of the first semantic vector, and $$\sqrt{\sum_{i=1}^{n}(B_i)^2}$$

is a magnitude of the second semantic vector.

Step 305: Determine a text corresponding to a semantic vector whose association degree meets a first preset condition as a recommended text corresponding to the target text for recommendation.

Association degrees between the semantic vector corresponding to the target text and semantic vectors corresponding to to-be-recommended texts are sequenced in descending order. The first preset condition is that the association degree between the semantic vector corresponding to the target text and the semantic vector corresponding to the to-be-recommended text ranks the first m places. A value of m may be preset, which is not limited in this embodiment of this application. In addition, the first preset condition may alternatively be that the association degree between the semantic vector corresponding to the target text and the semantic vector corresponding to the to-be-recommended text is greater than a preset degree. The preset degree may be set according to actual experience, which is not limited in this embodiment of this application.

When the association degree is obtained by using the cosine distance, cosine distances between the semantic vector corresponding to the target text and the semantic vectors corresponding to the to-be-recommended texts are sequenced in descending order. The first preset condition is that the cosine distance between the semantic vector corresponding to the target text and the semantic vector corresponding to the to-be-recommended text ranks the first m places. In addition, the first preset condition may alternatively be that the cosine distance between the semantic vector corresponding to the target text and the semantic vector corresponding to the to-be-recommended text is greater than a preset distance. The preset distance may be set according to actual experience, which is not limited in this embodiment of this application.

Some steps in this embodiment are the same as those in the embodiment shown in FIG. 2, and reference may be made to related descriptions in FIG. 2 for details. In addition, when subsequently a user requests a server for the target text by using a terminal, the server sends the target text to the terminal and sends the recommended text to the terminal at the same time, thereby implementing text recommendation to the user. In the foregoing manner, after browsing the target text, the user may continue to browse another text having a relatively large association degree with the target text, thereby increasing a residence time of the user in a user interface of a related application and increasing user stickiness.

Specifically, an identifier (ID) (for example, a title) of each target text is displayed in a user interface of an application providing a reading function. After a user triggers an ID of any target text, a client of the application sends a text obtaining request to a server. The text obtaining request carries the ID of the target text selected by the user. The server obtains the target text according to the ID of the target text carried in the text obtaining request, and obtains a recommended text corresponding to the target text by using the method provided in the embodiment shown in FIG. 3A, and then sends the target text and the recommended text to the client of the application. The client displays the target text and the recommended text in the user interface of the application at the same time.

Figure 3B:
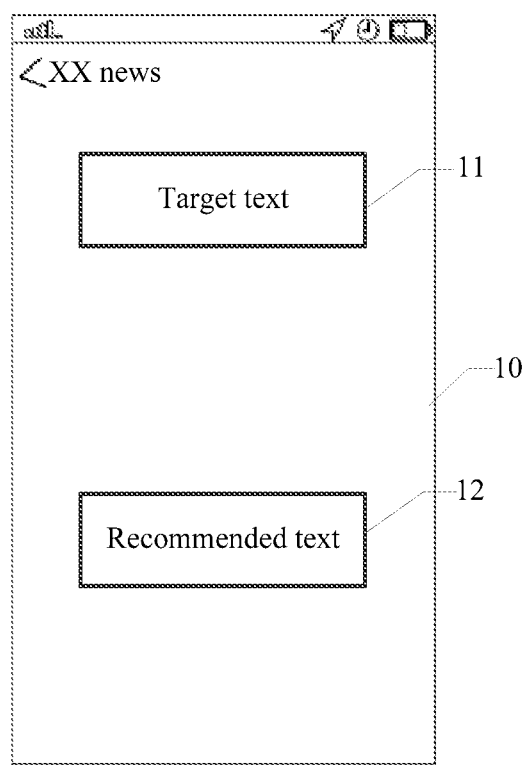
FIG. 3B is a schematic diagram of a text recommendation interface according to an exemplary embodiment of this application.

FIG. 3B is a schematic diagram of a text recommendation interface according to an exemplary embodiment of this application. A target text 11 and a recommended text 12 are displayed in a user interface 10 of an application providing a reading function.

In conclusion, in the method provided in the embodiments of this application, an integrated semantic vector of the target text is obtained by obtaining the at least two semantic vectors based on the at least two text analysis models and integrating the at least two semantic vectors. Because semantic vectors obtained by using different analysis models have respective advantages, the integrated semantic vector obtained by integrating the semantic vectors integrates the advantages of the semantic vectors. Therefore, the integrated semantic vector has a stronger representing capability, and can better represent text information of the target text. When text recommendation is subsequently performed based on the integrated semantic vector, an association degree between the recommended text and the target text can be increased, thereby improving recommendation accuracy.

Figure 4A:
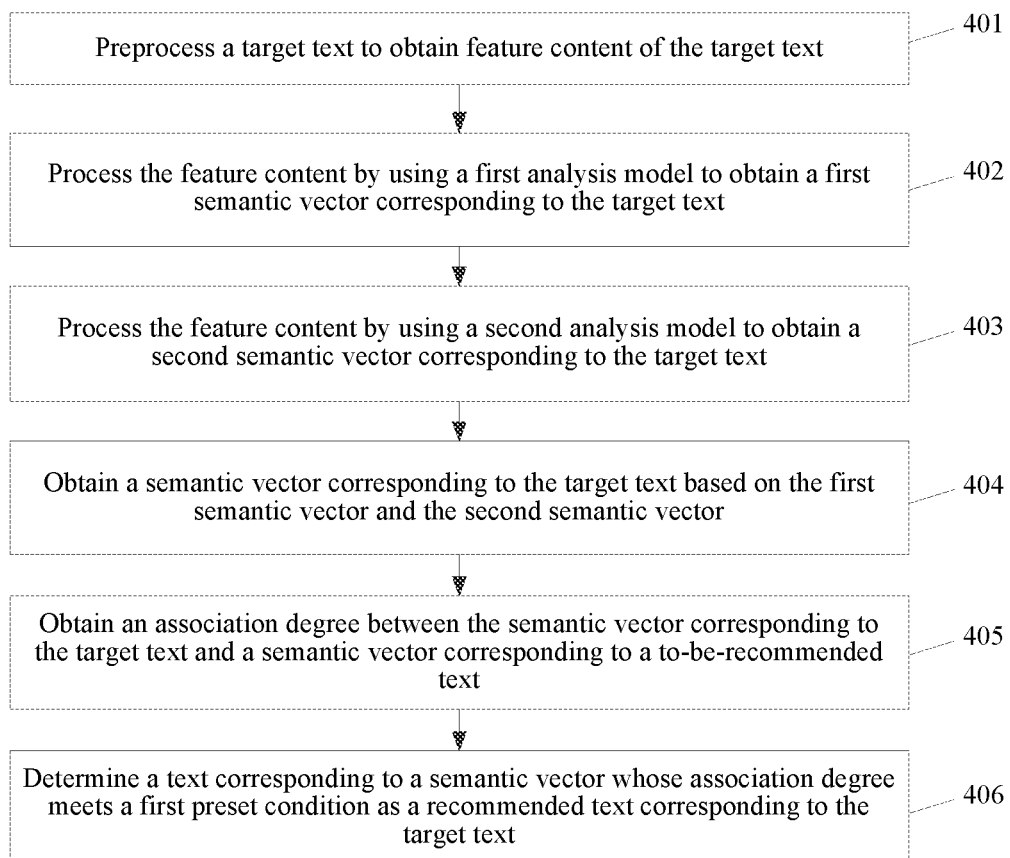
FIG. 4A is a flowchart of a text recommendation method according to another exemplary embodiment of this application.

FIG. 4A is a flowchart of a text recommendation method according to another embodiment of this application. In this embodiment of this application, the at least two text analysis models include a first analysis model and a second analysis model. The method may include the following steps:

Step 401: Preprocess a target text to obtain feature content of the target text.

Step 401 is the same as step 101, and details are not described herein again.

Step 402: Process the feature content by using the first analysis model to obtain a first semantic vector of the target text.

In this embodiment of this application, the first analysis model is a word4vec model. The word4vec model may resolve problems such as "polysemy" and "synonyms" in Chinese. When the feature content of the target text is processed by using the word2vec model, generally only a main feature word of the target text is processed.

Optionally, the feature content of the target text includes a main feature word of the target text, the first analysis model includes a correspondence between a word and a semantic vector, and step 402 may include the following substeps:

Step 402a: Search a correspondence to obtain a semantic vector corresponding to each main feature word.

The correspondence is a training result obtained by training the word4vec model. In addition, a process of training the word4vec model is described in the following embodiment.

Step 402b: Obtain a first semantic vector based on the semantic vector corresponding to each main feature word.

Optionally, an average value is calculated after semantic vectors corresponding to all main feature words are added, to obtain the first semantic vector. For example, semantic vectors corresponding to main feature words A, B, and C are respectively $w_A$, $w_B$, and $w_C$. Then the first semantic vector $w_a$ may be calculated by using the following formula:

$$w_a = \frac{w_A + w_B + w_C}{3}.$$

Step 403: Process the feature content by using the second analysis model to obtain a second semantic vector of the target text.

In this embodiment of this application, the second analysis model is a DNN model. A semantic vector obtained by using the DNN model has a relatively strong representing capability, and when text recommendation is subsequently performed, an association degree calculated between the target text and a recommended text is relatively accurate. In addition, when main feature words are processed, a sequence between the main feature words does not need to be considered, but when a title is processed, a sequence between words obtained by performing word segmentation on the title needs to be considered. Therefore, the main feature words and the title need to be separately processed.

Optionally, the feature content of the target text includes a main feature word and a title of the target text, and step 403 may include the following substeps:

Step 403a: Process the main feature word by using the second analysis model to obtain a semantic vector of the main feature word.

Optionally, the second analysis model includes a bag of words (BOW) layer. The BOW layer is used for processing the main feature word to obtain the semantic vector of the main feature word. In this case, step 403a is specifically implemented as: processing the main feature word by using the BOW layer to obtain the semantic vector of the main feature word.

There are usually a plurality of main feature words, and the main feature words are extracted from different sentences in a main body of the target text, and there is no particular sequence between the main feature words. Therefore, each main feature word is processed by using the BOW layer of the second analysis model to obtain a semantic vector of each main feature word. Optionally, an average value is calculated after the semantic vectors of the main feature words are added, to obtain the semantic vector of the main feature word.

Step 403b: Process the title by using the second analysis model to obtain a semantic vector corresponding to the title.

Optionally, the second analysis model includes a convolutional neural network (CNN) layer. The CNN layer is used for processing the title to obtain the semantic vector of the title. In this case, step 403b is specifically implemented as: processing the title by using the CNN layer to obtain the semantic vector of the title.

Before the title is processed, word segmentation needs to be performed on the title, and words obtained after the word segmentation are in a fixed sequence in the title. Therefore, the title is processed by using the CNN layer to obtain the semantic vector corresponding to the title.

Step 403c: Obtain a second semantic vector based on the semantic vector corresponding to the main feature word and the semantic vector corresponding to the title.

Optionally, the semantic vector corresponding to the main feature word and the semantic vector corresponding to the title are added to obtain the second semantic vector.

Optionally, the second analysis model further includes an input layer, an embedding layer, and a full connected layer. The input layer is used for inputting the main feature word and the title of the target text. The title and the main feature word are input at different locations of the input layer. In addition, before the main feature word and the title are input into the input layer, the main feature word and a word that is obtained by performing word segmentation on the title are usually represented by using different IDs. The embedding layer is used for indicating the main feature word and the title by using a random initialized vector. The full connected layer is used for further processing a sum of the semantic vector corresponding to the title output by the CNN layer and the semantic vector corresponding to the main feature word output by the BOW layer. The semantic vector corresponding to the target text output by the full connected layer has a stronger representing capability.

Figure 4B:
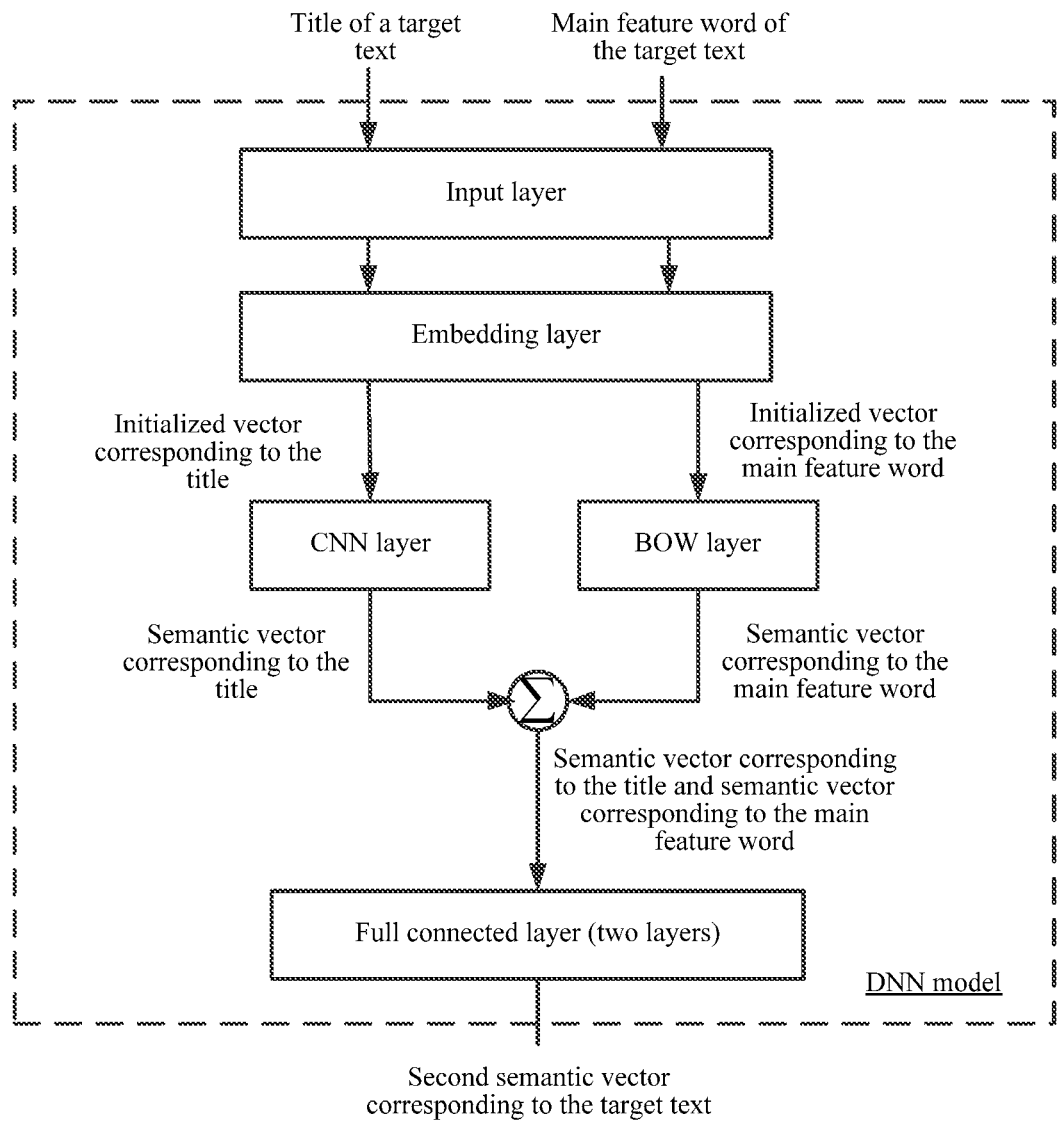
FIG. 4B is a schematic diagram of obtaining a second semantic vector by using a DNN model according to an exemplary embodiment of this application.

FIG. 4B is a schematic diagram of obtaining a second semantic vector by using a DNN model according to an exemplary embodiment of this application. The DNN model includes an input layer, an embedding layer, a CNN layer, a BOW layer, and two full connected layers. The title and the main feature word of the target text are separately input into the input layer, and then input into the embedding layer to obtain an initialized vector corresponding to the title and an initialized vector corresponding to the main feature word. The initialized vector corresponding to the title is input to the CNN layer, and a semantic vector corresponding to the title is output by the CNN layer. The initialized vector corresponding to the main feature word is input to the BOW layer, and a semantic vector corresponding to the main feature word is output by the BOW layer. Subsequently, the semantic vector corresponding to the title and the semantic vector corresponding to the main feature word are added and then input to the full connected layer to obtain a second semantic vector corresponding to the target text.

In this embodiment of this application, based on a sequence in the title, the main feature word and the title are separately processed, so that the second semantic vector obtained by using the DNN model can more accurately represent text information of the target text, and an association degree between a recommended text and the target text can be further increased when text recommendation is subsequently performed.

Step 404: Obtain a semantic vector corresponding to the target text based on the first semantic vector and the second semantic vector.

Optionally, vector splicing is performed on the first semantic vector and the second semantic vector to obtain the semantic vector corresponding to the target text. For example, if the first semantic vector is of 128 dimensions and the second semantic vector is of 200 dimensions, the semantic vector corresponding to the target text obtained after the vector splicing is of 328 dimensions.

Optionally, step 404 may include the following two substeps:

Step 404a: Obtain a first coefficient corresponding to the first semantic vector and a second coefficient corresponding to the second semantic vector.

The first coefficient and the second coefficient are set according to experience. In addition, when a recommended text corresponding to the target text is obtained subsequently, the first coefficient and the second coefficient may further be adjusted according to an association degree between the target text and the recommended text.

Step 404b: Splice a product of the first semantic vector and the first coefficient and a product of the second semantic vector and the second coefficient to obtain the semantic vector corresponding to the target text.

For example, if the first coefficient is k1, the second coefficient is k2, the first semantic vector is $w_a$, and the second semantic vector is $w_b$, the semantic vector $w_s$ corresponding to the target text obtained by splicing may be represented as $(k1w_a, k2w_b)$.

Step 405: Obtain an association degree between the semantic vector corresponding to the target text and a semantic vector corresponding to a to-be-recommended text.

Step 406: Determine a text corresponding to a semantic vector whose association degree meets a first preset condition as a recommended text corresponding to the target text for recommendation.

Step 405 and step 406 are the same as step 104 and step 105, and details are not described herein again.

Figure 4C:
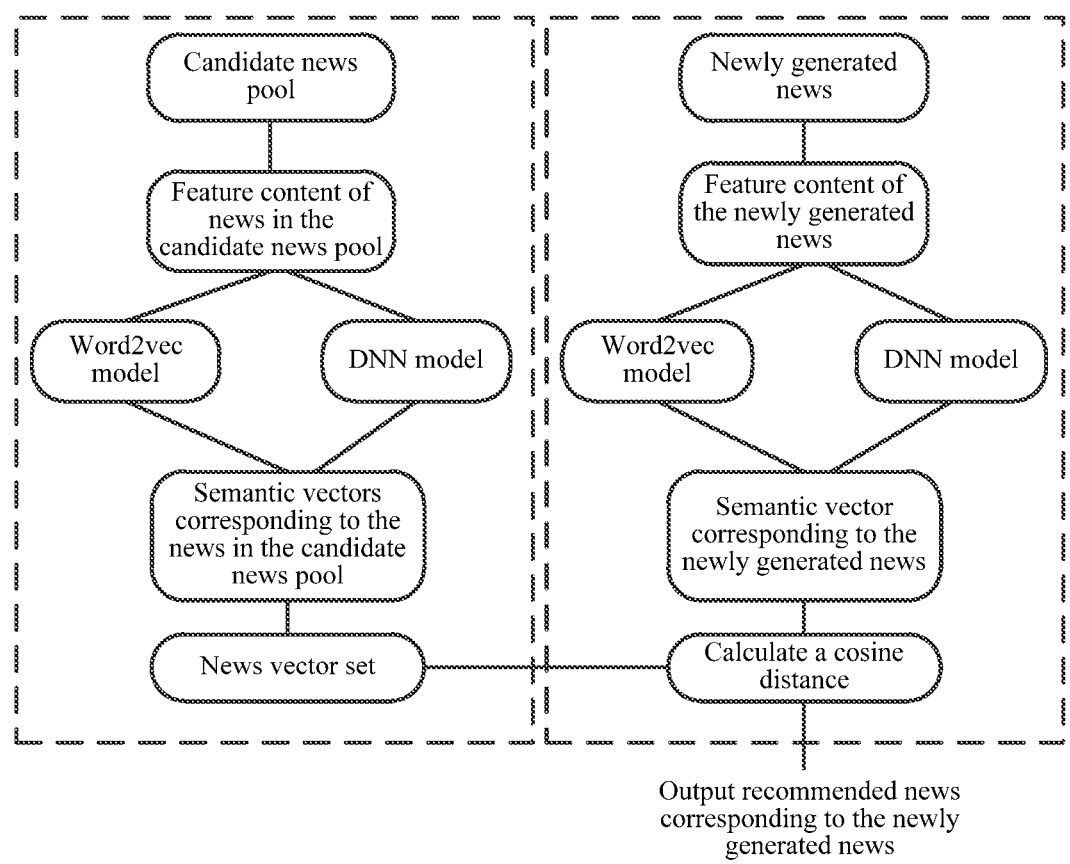
FIG. 4C is a schematic diagram of the embodiment shown in FIG. 4A being applied to the field of news recommendation.

The following explains a case that the embodiment shown in FIG. 4A is applied to the field of news recommendation. FIG. 4C is a schematic diagram of the embodiment shown in FIG. 4A being applied to the field of news recommendation.

A candidate news pool includes a plurality of pieces of news (to-be-recommended texts). The news in the candidate news pool is preprocessed to obtain feature content of the news. Subsequently, the feature content of the news is processed by using a word4vec model and a DNN model to obtain semantic vectors corresponding to the news, and the semantic vectors corresponding to the news form a news vector set. Each time one piece of news is generated subsequently, the newly generated news is preprocessed to obtain feature content of the newly generated news, and subsequently the feature content of the newly generated news is processed by using the word4vec model and the DNN model to obtain a semantic vector corresponding to the news. Cosine distances between the semantic vector corresponding to the news and vectors in the news vector set are calculated. The cosine distances are sequenced in descending order, and news corresponding to a cosine distance that ranks the first m places is selected as recommended news corresponding to the newly generated news.

In conclusion, in the method provided in the embodiments of this application, an integrated semantic vector of the target text is obtained by obtaining the at least two semantic vectors based on the at least two text analysis models and integrating the at least two semantic vectors. Because semantic vectors obtained by using different analysis models have respective advantages, the integrated semantic vector obtained by integrating the semantic vectors integrates the advantages of the semantic vectors. Therefore, the integrated semantic vector has a stronger representing capability, and can better represent text information of the target text. When text recommendation is subsequently performed based on the semantic vector, an association degree between the recommended text and the target text can be increased, thereby improving recommendation accuracy.

Further, the main feature word and the title are separately processed, so that the second semantic vector obtained by using the DNN model can more accurately represent text information of the target text, and an association degree between the recommended text and the target text can be further increased when text recommendation is subsequently performed.

A process of training the first analysis model is explained below.

Figure 5:
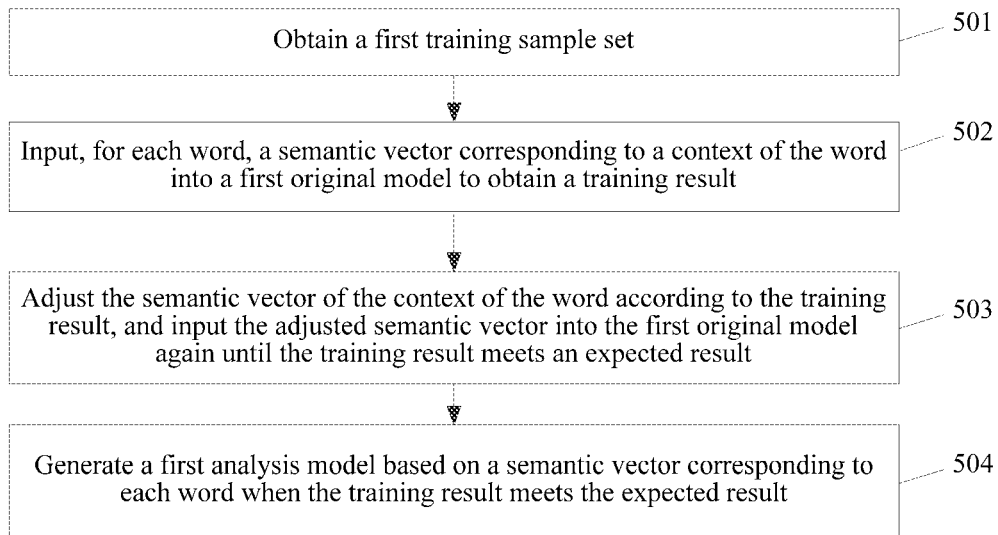
FIG. 5 is a flowchart of training a first analysis model according to an exemplary embodiment of this application.

FIG. 5 is a flowchart of training a first analysis model according to an embodiment of this application. The training a first analysis model may include the following steps 501 to 504.

Step 501: Obtain a first training sample set.

The first training sample set includes a plurality of first training samples. The first training sample may be a text. A server may directly read the first training sample from a database, or may obtain the first training sample from another electronic device that has established a communications connection to the server. Using an example in which the text recommendation method is applied to the field of news recommendation, the first training sample may be news within a preset time, and the preset time may be actually determined according to a requirement on a quantity of the first training samples. For example, the first training sample is news of the last year.

Each first training sample includes at least one word and a context of each word. A context of a word refers to words appearing before and after the word in a complete sentence. For example, in a sentence "today didn't rain", a context of "didn't" is "today" and "rain". The word and the context of the word are obtained by the server by performing word segmentation on a sentence included in the first training sample.

The word has a corresponding semantic vector, and the context of the word also has a corresponding semantic vector. The semantic vector corresponding to the word and the semantic vector corresponding to the context of the word are both obtained through randomization.

Step 502: Input, for each word, a semantic vector corresponding to a context of the word into a first original model to obtain a training result.

The first original model may be a continuous bag of words (CBOW) model or a Skip-gram model, which is not limited in this embodiment of this application. In this embodiment of this application, only an example in which the first original model is a CBOW model is used for description.

The training result includes an occurrence probability of each word. An occurrence probability of each word refers to a probability that the word appears in the context corresponding to the semantic vector input into the first original model.

Step 503: Adjust the semantic vector of the context of the word according to the training result, and input the adjusted semantic vector into the first original model again until the training result meets an expected result.

The expected result means that an occurrence probability of the word corresponding to the context meets a second preset condition. The second preset condition is that an occurrence probability of a word corresponding to the context is the largest. For example, an occurrence probability of "didn't" needs to be the largest between "today" and "rain".

The server may detect whether the training result meets the expected result. If the training result does not meet the expected result, the semantic vector corresponding to the context input into the first original model is correspondingly adjusted, and then steps of inputting the adjusted semantic vector into the first original model to obtain a training result, and adjusting the input semantic vector when the training result does not meet the expected result are repeated until the training result meets the expected result.

Step 504: Generate the first analysis model based on a semantic vector corresponding to each word when the training result meets the expected result.

When the training result meets the expected result, the semantic vector input into the first original model may be considered as a semantic vector corresponding to the context. When the first training samples are sufficient, for each word, a semantic vector corresponding to the word may be obtained. A preset correspondence between a word and a semantic vector corresponding to the word may be referred to as the first analysis model.

A process of training the second analysis model is explained below.

Figure 6A:
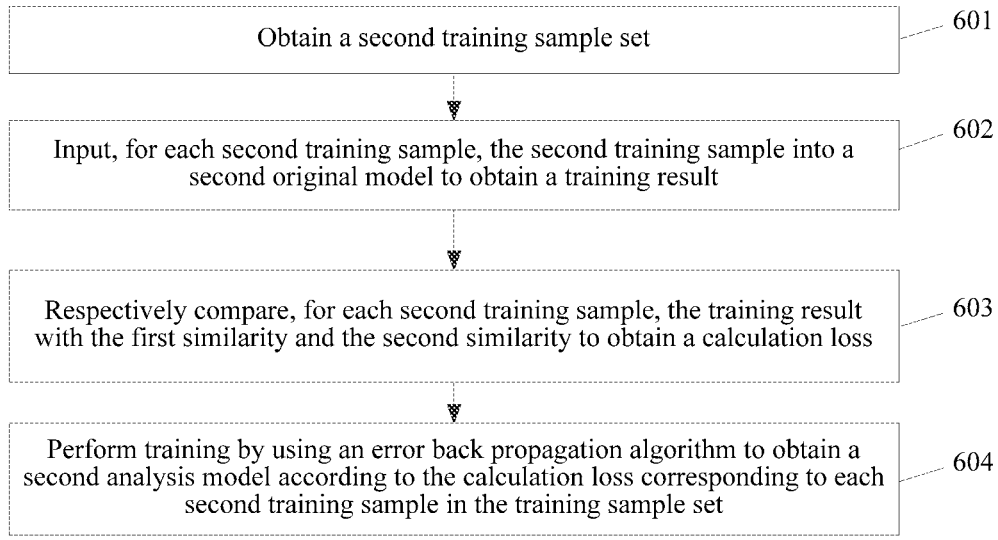
FIG. 6A is a flowchart of training a second analysis model according to an exemplary embodiment of this application.

FIG. 6A is a flowchart of training a second analysis model according to an embodiment of this application. The training a second analysis model may include the following steps 601 to 604.

Step 601: Obtain a second training sample set.

The second training sample set includes a plurality of second training samples. A server may directly read the second training sample from a database, or may obtain the second training sample from another electronic device that has established a communications connection to the server. Using an example in which the text recommendation method is applied to the field of news recommendation, the second training sample may be news within a preset time, and the preset time may be actually determined according to a requirement on a quantity of the second training samples.

Each second training sample includes a training text, a positive example of the training text, and a negative example of the training text. The training text, the positive example of the training text, and the negative example of the training text may be represented by using a ternary array {news, pos, neg}. news is the training text, which may be any text. pos is the positive example of the training text, which is generally a text related to the training text to some extent, and pos may be obtained by using a collaborative filtering method. neg is the negative example of the training text, which may be a text completely unrelated to the training text, and may be randomly selected. Generally, a proportion of pos and neg is 1:1.

Each second training text has a corresponding first similarity and second similarity, the first similarity is a similarity between the training text and the positive example of the training text, and the second similarity is a similarity between the training text and the negative example of the training text. news, pos, and neg are all represented by feature content of texts. For a process of obtaining the feature content of the texts, reference may be made to step 102, and details are not described herein again.

Step 602: Input, for each second training sample, the second training sample into a second original model to obtain a training result.

The second original model is a to-be-trained DNN model. Optionally, the second original model includes an input layer, an embedding layer, a CNN layer, a BOW layer, and a full connected layer. An initial parameter of each layer may be randomly set.

Feature content of news, pos, and neg included in the second training sample is input to the input layer. Before being input, the feature content of news, pos, and neg is generally represented as a one-hot vector, that is, each word included in the feature content is represented by using a unique ID.

The embedding layer is used for obtaining initialized semantic vectors corresponding to the feature content of news, pos, and neg. The CNN layer is used for processing titles of news, pos, and neg to obtain semantic vectors corresponding to the titles of news, pos, and neg. The BOW layer is used for processing main feature words of news, pos, and neg to obtain semantic vectors corresponding to the main feature words of news, pos, and neg.

The full connected layer respectively adds the semantic vectors corresponding to the titles and the semantic vectors corresponding to the main feature words to obtain semantic vectors respectively corresponding to news, pos, and neg.

The second original model respectively calculates a similarity between the semantic vector corresponding to news and the semantic vector corresponding to pos, and a similarity between the semantic vector corresponding to news and the semantic vector corresponding to neg. The two similarities are training results obtained by inputting the second training sample into the second original model.

Step 603: Respectively compare, for each second training sample, the training result with a first similarity and a second similarity to obtain a calculation loss.

The calculation loss is used for representing an error between the training result and the first similarity and an error between the training result and the second similarity. The calculation loss includes a first calculation loss and a second calculation loss. The first calculation loss is an error between the similarity between the semantic vector corresponding to news and the semantic vector corresponding to pos in the training result and the first similarity, and the second calculation loss is an error between the similarity between the semantic vector corresponding to news and the semantic vector corresponding to neg in the training result and the second similarity. Optionally, the second original model further includes a loss layer. The loss layer is used for calculating the calculation loss according to the training result, the first similarity, and the second similarity. Specifically, the loss layer calculates a difference between the similarity between the semantic vector corresponding to news and the semantic vector corresponding to pos in the training result and the first similarity to obtain the first calculation loss, and calculates a difference between the similarity between the semantic vector corresponding to news and the semantic vector corresponding to neg in the training result and the second similarity to obtain the second calculation loss.

Step 604: Perform training by using an error back propagation algorithm to obtain the second analysis model according to the calculation loss corresponding to each second training sample in the training sample set.

When the calculation loss does not meet a third preset condition, parameters between the input layer, the embedding layer, the CNN layer, and the BOW layer in the second original model are adjusted, and training is further performed based on the adjusted second original model until the calculation loss meets the third preset condition. The third preset condition is that the calculation loss is less than a preset value. The preset value may be actually set according to a requirement on precision of the DNN model, which is not limited in this embodiment of this application.

Figure 6B:
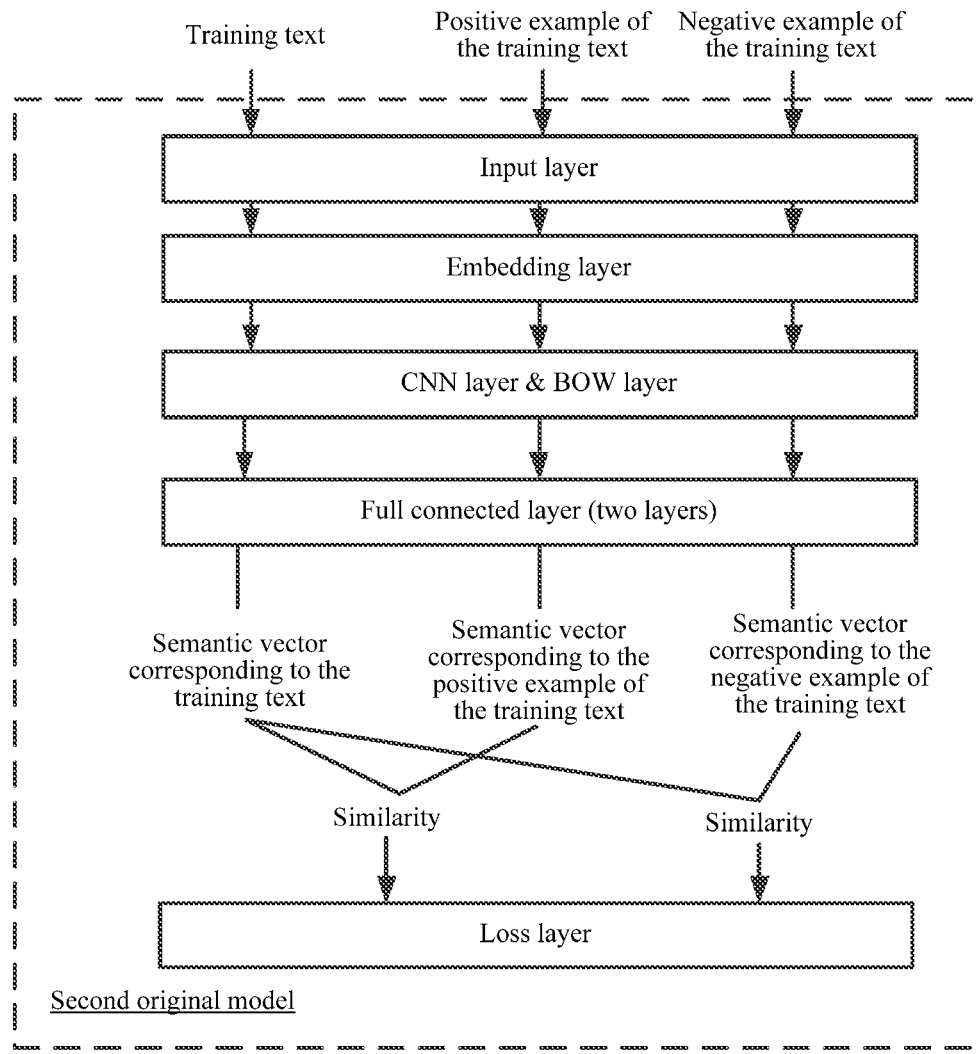
FIG. 6B is a schematic diagram of training a second analysis model according to an exemplary embodiment of this application.

FIG. 6B is a schematic diagram of training a second analysis model according to an exemplary embodiment of this application. A to-be-trained second original model includes an input layer, an embedding layer, a CNN layer, a BOW layer, two full connected layers, and a loss layer. A training text, a positive example of the training text, and a negative example of the training text are input into the second original model, and sequentially processed by the input layer, the embedding layer, the CNN layer, the BOW layer, and the two full connected layers, and then a semantic vector corresponding to the training text, a semantic vector corresponding to the positive example of the training text, and a semantic vector corresponding to the negative example of the training text are obtained. A similarity between the semantic vector corresponding to the training text and the semantic vector corresponding to the positive example of the training text and a similarity between the semantic vector corresponding to the training text and the semantic vector corresponding to the negative example of the training text are calculated and input into the loss layer. The loss layer calculates a calculation loss. Subsequently, parameters of the layers included in the second original model may be adjusted according to the calculation loss, and training may be further performed based on the adjusted second original model until the calculation loss meets a third preset condition.

The following is an apparatus embodiment of this application, which can be used to execute the method embodiments of this application. For details not disclosed in the apparatus embodiment of this application, refer to the method embodiments of this application.

Figure 7:
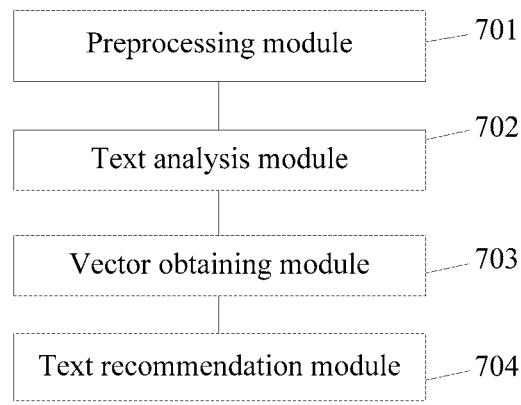
FIG. 7 is a block diagram of a text recommendation apparatus according to an exemplary embodiment of this application.

FIG. 7 is a block diagram of a text recommendation apparatus according to an embodiment of this application. The apparatus has functions of implementing the foregoing method examples. The functions may be implemented by using hardware, or may be implemented by hardware executing corresponding software. The apparatus may include:

a preprocessing module 701, a text analysis module 702, a vector obtaining module 703, and a text recommendation module 704.

The preprocessing module 701 is configured to preprocess a target text to obtain feature content of the target text.

The text analysis module 702 is configured to process the feature content by using at least two text analysis models to obtain at least two semantic vectors of the target text.

The vector obtaining module 703 is configured to integrate the at least two semantic vectors of the target text to generate an integrated semantic vector of the target text.

The text recommendation module 704 is configured to select, according to the integrated semantic vector of the target text and an integrated semantic vector of at least one to-be-recommended text, a recommended text corresponding to the target text from the at least one to-be-recommended text.

Figure 8:
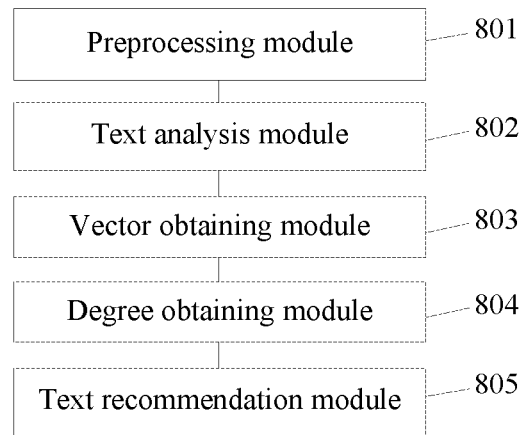
FIG. 8 is a block diagram of a text recommendation apparatus according to another exemplary embodiment of this application.

FIG. 8 is a block diagram of a text recommendation apparatus according to an embodiment of this application. The apparatus has functions of implementing the foregoing method examples. The functions may be implemented by using hardware, or may be implemented by hardware executing corresponding software. The apparatus may include: a preprocessing module 801, a text analysis module 802, a vector obtaining module 803, a degree obtaining module 804, and a text recommendation module 805.

The preprocessing module 801 is configured to preprocess a target text to obtain feature content of the target text.

The text analysis module 802 is configured to process the feature content based on at least two text analysis models to obtain at least two semantic vectors.

The vector obtaining module 803 is configured to obtain a semantic vector corresponding to the target text according to the at least two semantic vectors.

The degree obtaining module 804 is configured to obtain an association degree between the semantic vector corresponding to the target text and a semantic vector corresponding to a to-be-recommended text, where the association degree is used for representing a similarity between the target text and the to-be-recommended text.

The text recommendation module 805 is configured to determine a to-be-recommended text corresponding to a semantic vector whose association degree meets a first preset condition as a recommended text corresponding to the target text for recommendation.

In an optional embodiment provided based on the embodiment shown in FIG. 8, the at least two text analysis models include a first analysis model and a second analysis model, and the text analysis module 802 includes a first processing unit and a second processing unit (not shown in the figure).

The first processing unit is configured to process the feature content by using the first analysis model to obtain a first semantic vector corresponding to the target text.

The second processing unit is configured to process the feature content by using the second analysis model to obtain a second semantic vector corresponding to the target text.

The vector obtaining module 803 is configured to obtain a semantic vector corresponding to the target text based on the first semantic vector and the second semantic vector.

Optionally, the feature content of the target text includes a main feature word of the target text, the first analysis model includes a correspondence between a word and a semantic vector, and the first processing unit is configured to:

search the correspondence to obtain a semantic vector corresponding to each main feature word; and
obtain the first semantic vector based on the semantic vector corresponding to each main feature word.

Optionally, the feature content of the target text includes a main feature word and a title of the target text, and the second processing unit is configured to:

process the main feature word by using the second analysis model to obtain a semantic vector corresponding to the main feature word;
process the title by using the second analysis model to obtain a semantic vector corresponding to the title; and
obtain the second semantic vector based on the semantic vector corresponding to the main feature word and the semantic vector corresponding to the title.

Optionally, the second analysis model includes a BOW layer and a CNN layer, and the second processing unit is specifically configured to: process the main feature word by using the BOW layer to obtain a semantic vector corresponding to the main feature word; and process the title by using the CNN layer to obtain a semantic vector corresponding to the title.

Optionally, the vector obtaining module 803 is specifically configured to:

obtain a first coefficient corresponding to the first semantic vector and a second coefficient corresponding to the second semantic vector; and
splice a product of the first semantic vector and the first coefficient and a product of the second semantic vector and the second coefficient to obtain the semantic vector corresponding to the target text.

Figure 9:
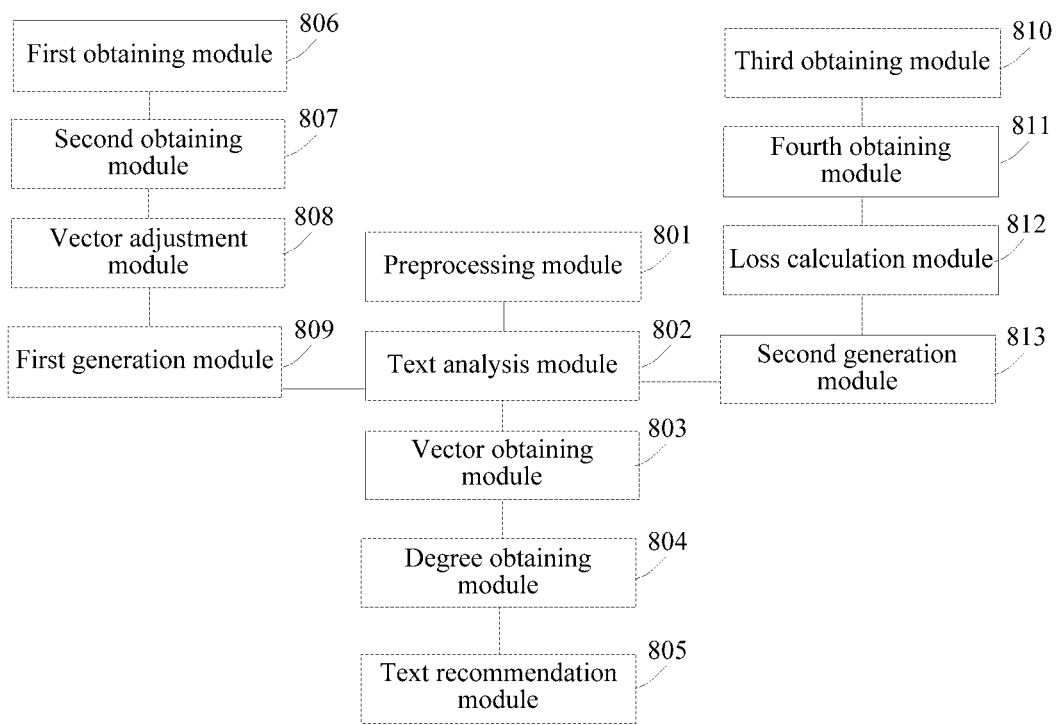
FIG. 9 is a block diagram of a text recommendation apparatus according to another exemplary embodiment of this application.

In another optional embodiment provided based on the embodiment shown in FIG. 8, referring to FIG. 9, the apparatus further includes: a first obtaining module 806, a second obtaining module 807, a vector adjustment module 808, and a first generation module 809.

The first obtaining module 806 is configured to obtain a first training sample set, where the first training sample set includes a plurality of first training samples, each first training sample includes at least one word and a context of each word, the word has a corresponding semantic vector, and the context of the word also has a corresponding semantic vector.

The second obtaining module 807 is configured to input, for each word, the semantic vector corresponding to the context of the word into a first original model to obtain a training result, where the training result includes an occurrence probability of each word.

The vector adjustment module 808 is configured to adjust the semantic vector of the context of the word according to the training result, and input the adjusted semantic vector into the first original model again until the training result meets an expected result, where the expected result means that an occurrence probability of the word corresponding to the context meets a second preset condition.

The first generation module 809 is configured to generate the first analysis model based on the semantic vector corresponding to each word in a case that the training result meets the expected result.

In another optional embodiment provided based on the embodiment shown in FIG. 8, referring to FIG. 9, the apparatus further includes: a third obtaining module 810, a fourth obtaining module 811, a loss calculation module 812, and a second generation module 813.

The third obtaining module 810 is configured to obtain a second training sample set, where the second training sample set includes a plurality of second training samples, each second training sample includes a training text, a positive example of the training text, and a negative example of the training text, each second training text has a corresponding first similarity and second similarity, the first similarity is a similarity between the training text and the positive example of the training text, and the second similarity is a similarity between the training text and the negative example of the training text.

The fourth obtaining module 811 is configured to input, for each second training sample, the second training sample into a second original model to obtain a training result.

The loss calculation module 812 is configured to respectively compare, for each second training sample, the training result with the first similarity and the second similarity to obtain a calculation loss, where the calculation loss is used for representing an error between the training result and the first similarity and an error between the training result and the second similarity.

The second generation module 813 is configured to perform training by using an error back propagation algorithm to obtain the second analysis model according to the calculation loss corresponding to each second training sample in the training sample set.

In conclusion, the apparatus provided in the embodiments of this application obtains the at least two semantic vectors based on the at least two text analysis models and obtains the semantic vector corresponding to the target text based on the at least two semantic vectors. The semantic vector obtained in the foregoing manner has a stronger representing capability, and can better represent text information of the target text. When text recommendation is subsequently performed based on the semantic vector, an association degree between the recommended text and the target text can be increased, thereby improving recommendation accuracy.

Figure 10:
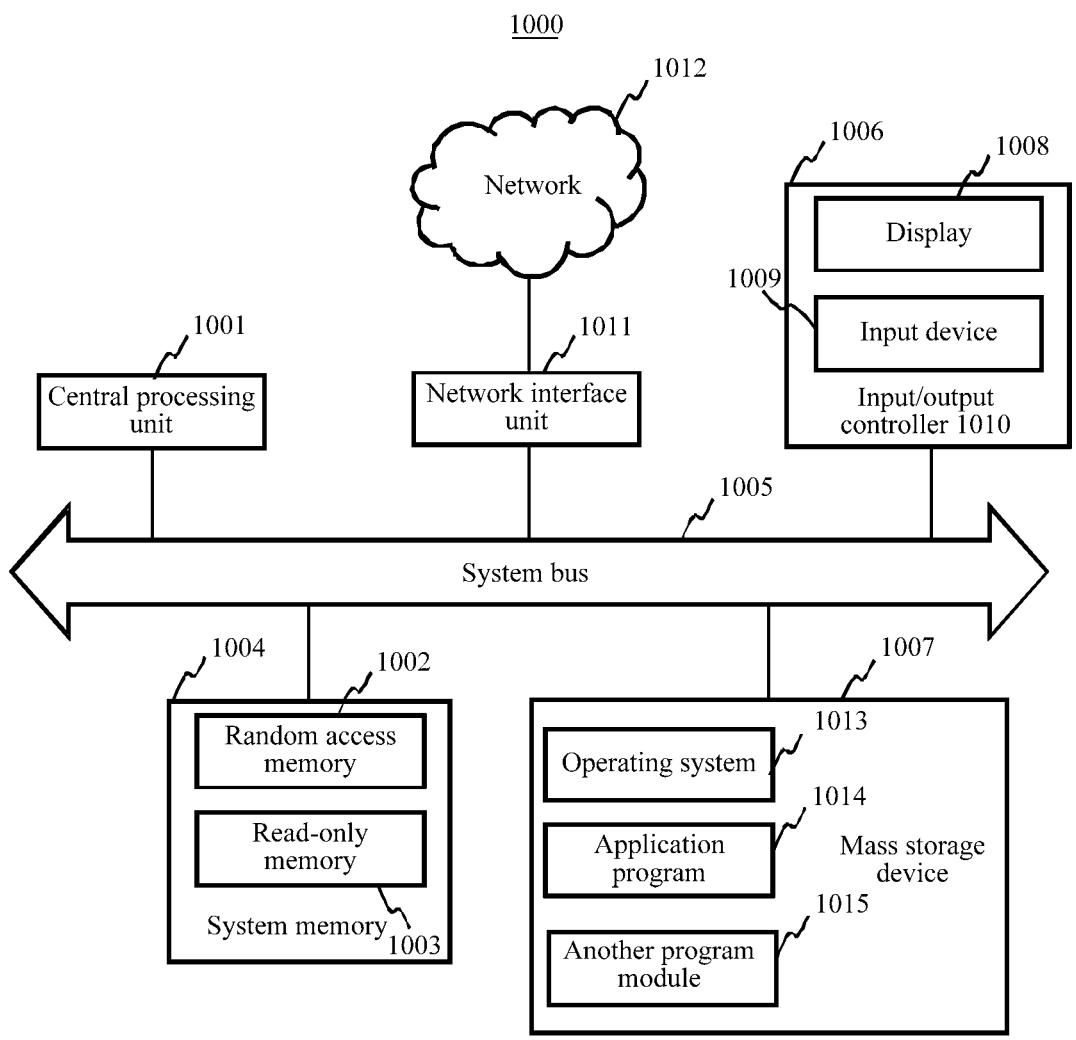
FIG. 10 is a block diagram of an electronic device according to an exemplary embodiment of this application.

FIG. 10 is a schematic structural diagram of an electronic device according to an embodiment of this application. The electronic device may be a server. The electronic device is configured to implement the text recommendation method provided in the foregoing embodiments. Specifically:

The electronic device 1000 includes a central processing unit (CPU) 1001, a system memory 1004 including a random access memory (RAM) 1002 and a read-only memory (ROM) 1003, and a system bus 1005 connecting the system memory 1004 and the CPU 1001. The electronic device 1000 further includes a basic input/output system (I/O system) 1006 configured to transmit information between components in a computer, and a mass storage device 1007 configured to store an operating system 1013, an application program 1014, and another program module 1015.

The basic I/O system 1006 includes a display 1008 configured to display information, and an input device 1009 used by a user to input information, such as a mouse or a keyboard. The display 1008 and the input device 1009 are both connected to the CPU 1001 by using an input/output controller 1010 connected to the system bus 1005. The basic I/O system 1006 may further include the input/output controller 1010, to receive and process inputs from other devices, such as a keyboard, a mouse, or an electronic stylus. Similarly, the input/output controller 1010 further provides an output to a display screen, a printer, or another type of output device.

The mass storage device 1007 is connected to the CPU 1001 by using a mass storage controller (not shown) connected to the system bus 1005. The mass storage device 1007 and an associated computer-readable medium provide non-volatile storage for the electronic device 1000. That is, the mass storage device 1007 may include a computer-readable medium (not shown), such as a hard disk or a CD-ROM drive.

Without loss of generality, the computer-readable medium may include a computer storage medium and a communication medium. The computer storage medium includes volatile and non-volatile media, and removable and non-removable media implemented by using any method or technology and configured to store information such as a computer-readable instruction, a data structure, a program module, or other data. The computer storage medium includes a RAM, a ROM, an EPROM, an EEPROM, a flash memory, or other solid storage technologies; a CD-ROM, a DVD, or other optical storages; and a cassette, a magnetic tape, a disk storage, or other magnetic storage devices. Certainly, a person skilled in the art may know that the computer storage medium is not limited to the foregoing types. The system memory 1004 and the mass storage device 1007 may be collectively referred to as a memory.

According to the embodiments of this application, the electronic device 1000 may further be connected through a network such as the Internet to a remote computer on the network. That is, the electronic device 1000 may be connected to a network 1012 by using a network interface unit 1011 connected to the system bus 1005, or may be connected to another type of network or a remote computer system (not shown) by using a network interface unit 1011.

The memory stores at least one instruction, at least one program, and a code set or an instruction set, and the at least one instruction, the at least one program, and the code set or the instruction set is loaded and executed by the processor to implement the text recommendation method in the foregoing method embodiments.

In an exemplary embodiment, a computer-readable storage medium is further provided, the storage medium storing at least one instruction, at least one program, and a code set or an instruction set, and the at least one instruction, the at least one program, and the code set or the instruction set being loaded and executed by a processor of an electronic device to implement the text recommendation method in the foregoing method embodiments.

Optionally, the computer-readable storage medium may be a ROM, a RAM, a CD-ROM, a magnetic tape, a floppy disk, an optical data storage device, or the like.

It is to be understood that "plurality of" mentioned in the specification means two or more. The term "and/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects. The "first", the "second" and similar terms used herein do not indicate any order, quantity or significance, but are used to only distinguish different components.

The sequence numbers of the foregoing embodiments of this application are merely for description purpose and do not indicate the preference of the embodiments.

The foregoing descriptions are merely examples of the embodiments of this application, but are not intended to limit this application. Any modification, equivalent replacement, or improvement made without departing from the spirit and principle of this application falls within the protection scope of this application.

What is claimed is:

1. A text recommendation method, applied to an electronic device, the method comprising:
    extracting feature content from a target text;
    processing the feature content based on at least two text analysis models to obtain at least two semantic vectors of the target text, wherein:
        the two text analysis models include a first analysis model and a second analysis model; and
        the processing includes using the first analysis model to obtain a first semantic vector of the target text and using the second analysis model to obtain a second semantic vector of the target text;
    integrating the first and second semantic vectors of the target text into an integrated semantic vector of the target text; and
    selecting, according to the integrated semantic vector of the target text and an integrated semantic vector of at least one to-be-recommended text, a recommended text corresponding to the target text from the at least one to-be-recommended text.

2. The method according to claim 1, wherein:
    the feature content comprises a main feature word of the target text; and
    the processing the feature content comprises:
        obtaining a semantic vector of the main feature word of the target text using the first analysis model; and
        obtaining the first semantic vector based on the semantic vector of the main feature word.

3. The method according to claim 1, wherein:
    the feature content comprises a main feature word and a title of the target text; and
    the processing the feature content comprises:
        processing the main feature word using the second analysis model to obtain a semantic vector of the main feature word;
        processing the title using the second analysis model to obtain a semantic vector of the title; and
        obtaining the second semantic vector based on the semantic vector of the main feature word and the semantic vector of the title.

4. The method according to claim 3, wherein the second analysis model comprises a bag of words (BOW) layer and a convolutional neural network (CNN) layer; the BOW layer is used for processing the main feature word to obtain the semantic vector of the main feature word; and the CNN layer is used for processing the title to obtain the semantic vector of the title.

5. The method according to claim 1, wherein the integrating the first and second semantic vectors comprises:
    obtaining a first coefficient corresponding to the first semantic vector and a second coefficient corresponding to the second semantic vector; and
    splicing a product of the first semantic vector and the first coefficient and a product of the second semantic vector and the second coefficient to obtain the integrated semantic vector of the target text.

6. The method according to claim 1, wherein the selecting, according to the integrated semantic vector of the target text and an integrated semantic vector of at least one to-be-recommended text, a recommended text corresponding to the target text from the at least one to-be-recommended text comprises:
    obtaining an association degree between the integrated semantic vector of the target text and an integrated semantic vector of each to-be-recommended text, wherein the association degree is used for representing a similarity between the target text and the to-be-recommended text; and
    determining a to-be-recommended text whose association degree meets a first preset condition as the recommended text corresponding to the target text.

7. The method according to claim 1, further comprising:
    before processing the feature content by using at least two text analysis models to obtain at least two semantic vectors of the target text:
        obtaining a first training sample set, wherein the first training sample set comprises a plurality of first training samples, and each first training sample comprises at least one word and a context of each word, the word has a corresponding semantic vector, and the context of the word has a corresponding semantic vector;
        inputting, for each word, the semantic vector corresponding to the context of the word into a first original model to obtain a training result, wherein the training result comprises an occurrence probability of each word;
        adjusting the semantic vector of the context of the word according to the training result, and inputting the adjusted semantic vector into the first original model again until the training result meets an expected result, wherein the expected result means that an occurrence probability of the word corresponding to the context meets a second preset condition; and
        generating the first analysis model based on the semantic vector corresponding to each word in a case that the training result meets the expected result.

8. The method according to claim 1, further comprising:
    before processing the feature content by using at least two text analysis models to obtain at least two semantic vectors of the target text,
        obtaining a second training sample set, wherein the second training sample set comprises a plurality of second training samples, each second training sample comprises a training text, a positive example of the training text, and a negative example of the training text, each second training text has a corresponding first similarity and second similarity, the first similarity is a similarity between the training text and the positive example of the training text, and the second similarity is a similarity between the training text and the negative example of the training text;

inputting, for each second training sample, the second training sample into a second original model to obtain a training result;

respectively comparing, for each second training sample, the training result with the first similarity and the second similarity to obtain a calculation loss, wherein the calculation loss is used for representing an error between the training result and the first similarity and an error between the training result and the second similarity; and performing training by using an error back propagation algorithm to obtain the second analysis model according to the calculation loss corresponding to each second training sample in the training sample set.

9. An electronic device, comprising:

a processor; and memory storing at least one instruction that, when executed by the processor, cause the processor to perform operations including:

extracting feature content from a target text;

processing the feature content based on at least two text analysis models to obtain at least two semantic vectors of the target text, wherein:
the two text analysis models include a first analysis model and a second analysis model; and
the processing includes using the first analysis model to obtain a first semantic vector of the target text and using the second analysis model to obtain a second semantic vector of the target text;

integrating the first and second semantic vectors of the target text into an integrated semantic vector of the target text; and selecting, according to the integrated semantic vector of the target text and an integrated semantic vector of at least one to-be-recommended text, a recommended text corresponding to the target text from the at least one to-be-recommended text.

10. The electronic device according to claim 9, wherein the feature content comprises a main feature word of the target text; and the processing the feature content comprises:
obtaining a semantic vector of the main feature word of the target text using the first analysis model; and
obtaining the first semantic vector based on the semantic vector of the main feature word.

11. The electronic device according to claim 9, wherein the feature content comprises a main feature word and a title of the target text; and the processing the feature content comprises:
processing the main feature word using the second analysis model to obtain a semantic vector of the main feature word;
processing the title using the second analysis model to obtain a semantic vector of the title; and
obtaining the second semantic vector based on the semantic vector of the main feature word and the semantic vector of the title.

12. The electronic device according to claim 9, wherein the integrating the at least two semantic vectors of the target text into an integrated semantic vector of the target text comprises:

obtaining a first coefficient corresponding to the first semantic vector and a second coefficient corresponding to the second semantic vector; and splicing a product of the first semantic vector and the first coefficient and a product of the second semantic vector and the second coefficient to obtain the integrated semantic vector of the target text.

13. The electronic device according to claim 9, wherein the selecting, according to the integrated semantic vector of the target text and an integrated semantic vector of at least one to-be-recommended text, a recommended text corresponding to the target text from the at least one to-be-recommended text comprises:

obtaining an association degree between the integrated semantic vector of the target text and an integrated semantic vector of each to-be-recommended text, wherein the association degree is used for representing a similarity between the target text and the to-be-recommended text; and determining a to-be-recommended text whose association degree meets a first preset condition as the recommended text corresponding to the target text.

14. A non-transitory computer-readable storage medium, storing at least one instruction that, when executed by a processor, cause the processor to perform operations including:

extracting feature content from a target text;

processing the feature content based on at least two text analysis models to obtain at least two semantic vectors of the target text, wherein:
the two text analysis models include a first analysis model and a second analysis model; and
the processing includes using the first analysis model to obtain a first semantic vector of the target text and using the second analysis model to obtain a second semantic vector of the target text;

integrating the first and second semantic vectors of the target text into an integrated semantic vector of the target text; and selecting, according to the integrated semantic vector of the target text and an integrated semantic vector of at least one to-be-recommended text, a recommended text corresponding to the target text from the at least one to-be-recommended text.

15. The non-transitory computer-readable storage medium according to claim 14, wherein:

the feature content comprises a main feature word and a title of the target text; and the processing the feature content comprises:
processing the main feature word using the second analysis model to obtain a semantic vector of the main feature word;
processing the title using the second analysis model to obtain a semantic vector of the title; and
obtaining the second semantic vector based on the semantic vector of the main feature word and the semantic vector of the title.

16. The non-transitory computer-readable storage medium according to claim 14, wherein the integrating the first and second semantic vectors comprises:

obtaining a first coefficient corresponding to the first semantic vector and a second coefficient corresponding to the second semantic vector; and splicing a product of the first semantic vector and the first coefficient and a product of the second semantic vector and the second coefficient to obtain the integrated semantic vector of the target text.

17. The non-transitory computer-readable storage medium according to claim 14, wherein the selecting, according to the integrated semantic vector of the target text and an integrated semantic vector of at least one to-be-recommended text, a recommended text corresponding to the target text from the at least one to-be-recommended text comprises:
- obtaining an association degree between the integrated semantic vector of the target text and an integrated semantic vector of each to-be-recommended text, wherein the association degree is used for representing a similarity between the target text and the to-be-recommended text; and
- determining a to-be-recommended text whose association degree meets a first preset condition as the recommended text corresponding to the target text.

* * * * *